United States Patent
Li et al.

(10) Patent No.: US 11,747,522 B1
(45) Date of Patent: Sep. 5, 2023

(54) TWILL OPTICAL FILM CAPABLE OF REALIZING 3D EFFECT OF NAKED EYE OF DISPLAY SCREEN AND PREPARATION METHOD THEREOF

(71) Applicant: People Baiye Technology Co., LTD., Yancheng (CN)

(72) Inventors: Zhihui Li, Yancheng (CN); Yong Sun, Yancheng (CN); Meiming Xiao, Yancheng (CN)

(73) Assignee: People Baiye Technology Co., LTD., Yancheng (CN)

( * ) Notice: Subject to any disclaimer, the term of this patent is extended or adjusted under 35 U.S.C. 154(b) by 0 days.

(21) Appl. No.: 18/177,119

(22) Filed: Mar. 2, 2023

Related U.S. Application Data

(63) Continuation of application No. PCT/CN2022/142193, filed on Dec. 27, 2022.

(30) Foreign Application Priority Data

May 23, 2022 (CN) .......................... 202210559700.9

(51) Int. Cl.
  *G02B 3/00*  (2006.01)
  *G02B 1/04*  (2006.01)
  *G02B 30/27* (2020.01)

(52) U.S. Cl.
  CPC .......... *G02B 3/0031* (2013.01); *G02B 1/041* (2013.01); *G02B 30/27* (2020.01)

(58) Field of Classification Search
  CPC . G02B 3/0031; G02B 30/27–29; G02B 1/041
  See application file for complete search history.

(56) References Cited

U.S. PATENT DOCUMENTS

2002/0080323 A1*  6/2002  Muroya ........... B29D 11/00442
                                                    349/187

FOREIGN PATENT DOCUMENTS

| CN | 101600979 A | 12/2009 |
| CN | 102076774 A | 5/2011 |
| CN | 102925036 A | 2/2013 |
| CN | 104910756 A | 9/2015 |
| CN | 105399139 A | 3/2016 |
| CN | 107636038 A | 1/2018 |
| CN | 109134825 A | 1/2019 |
| CN | 112813531 A | 5/2021 |

* cited by examiner

*Primary Examiner* — Alex A Rolland
(74) *Attorney, Agent, or Firm* — Nitin Kaushik

(57) ABSTRACT

The present disclosure discloses a twill optical film capable of realizing a 3D effect of a naked eye of a display screen and a preparation method thereof. The preparation method of the twill optical film includes the steps of: step 1: coating a grating coating with a high refractive index on one side of a transparent base film using a micro-nano imprint technique, and curing same by ultraviolet to form a uniformly arranged columnar lens array; and obtaining a twill grating layer; step 2: coating a filling coating with a low refractive index on the twill grating layer and curing same by ultraviolet; placing same in an oven in an atmosphere with a relative humidity of 95-98% controlled by a saturated solution of ammonium dihydrogen phosphate; setting the temperature to 100-120° C., and thermally cross-linking same for 3-4 hours; and obtaining a twill optical film.

6 Claims, No Drawings

TWILL OPTICAL FILM CAPABLE OF REALIZING 3D EFFECT OF NAKED EYE OF DISPLAY SCREEN AND PREPARATION METHOD THEREOF

CROSS-REFERENCE TO RELATED APPLICATIONS

The application claims priority to Chinese patent application No. 202210559700.9, filed on May 23, 2022, the entire contents of which are incorporated herein by reference.

TECHNICAL FIELD

The present disclosure relates to the technical field of optical films, in particular to a twill optical film capable of realizing a 3D effect of a naked eye of a display screen and a preparation method thereof.

BACKGROUND

With the development of science and technology, screen display technology satisfies people's higher and higher demand. People pursue higher quality for visual enjoyment. Driven by the pursuit of quality, a naked-eye 3D technology has attracted much attention. The naked-eye 3D technology is a technique that projects different images to the left and right eyes through the grating and the distributed matrix optical technique, promote the difference of vision to form the corresponding stereoscopic image. This technique can get rid of the eye restraint and enhance visual perception.

In the prior art, an optical film having a naked-eye 3D effect has a grating as a component mainly producing a stereoscopic effect; the grating types include slit gratings and lenticular gratings. Because of the single type of grating, the transmittance of slit grating is generally only 20-30%. The poor light quality results in the perception of vertigo and headache, and it usually needs to add an additional light source to produce the 25 effect, so that mass printing production cannot be achieved, which greatly limits the application. A lenticular grating is a grating composed of an array of transparent strip-shaped cylindrical lenses, which refracts light at a fixed angle and can produce a clear 3D effect without adding an additional light source. However, the internal cross-linking density of the existing cylindrical lens array materials is not enough; in addition, the adhesion between the cylindrical lens array and the transparent base film and the filling material is not enough, and there are pores, which increases the internal refraction of light and changes the line-of-sight position of the grating image, so that the viewpoint width decreases, the degree of ghosting increases and the screen brightness decreases, thus affecting the stereoscopic effect.

Therefore, it is important to prepare a twill optical film capable of realizing a 3D effect of a naked eye of a display screen.

SUMMARY

It is an object of the present disclosure to provide a twill optical film capable of realizing a 3D effect of a naked eye of a display screen and a preparation method thereof to solve the problems set forth in the above background art.

In order to solve the above technical problem, the present disclosure provides the following technical solutions:

a preparation method of a twill optical film capable of realizing a 3D effect of a naked eye of a display screen, which includes the steps of:

step 1: coating a grating coating with a high refractive index on one side of a transparent base film using a micro-nano imprint technique, and curing same by ultraviolet to form a uniformly arranged columnar lens array; and obtaining a twill grating layer;

step 2: coating a filling coating with a low refractive index on the twill grating layer and curing same by ultraviolet; placing same in an oven in an atmosphere with a relative humidity of 95-98% controlled by a saturated solution of ammonium dihydrogen phosphate; setting the temperature to 100-120° C., and thermally cross-linking same for 3-4 hours.

The transparent base film has a thickness of 100 μm; the grating layer has a thickness of 80 μm; and the filling layer has a thickness of 70 μm.

Preferably, in the micro-nano imprint technique, the imprinting speed is 20-30 30 m/h and the pressure is 0.1-0.15 Mpa; in the process of curing by ultraviolet, the power is 60-100 W/cm$^2$, the energy is 800-900 mj/cm$^2$, and the curing time is 2-3 seconds.

Preferably, the raw material of the grating coating includes the following components: by weight, 50-65 parts of an acrylic resin with a high refractive index, 20-25 parts of a bisphenol fluorenyl acrylate, 5-7 parts of a modified titanium oxide, 12-18 parts of pentaerythritol tetrakis (3-mercaptopropionate), and 1-2 parts of a photoinitiator; and the acrylic resin with a high refractive index has a refractive index of 1.61 to 1.63.

Preferably, the raw material of the filling coating includes the following components: by weight, 35 to 40 parts of an acrylic resin with a low refractive index, 40 to 45 parts of a perfluorinated acrylic monomer, 8 to 10 parts of an allyl glycidyl ether, 2 to 3 parts of tetra-n-propoxy zirconium, 1.2 to 2.5 parts of a photoinitiator, and 0.5 to 0.8 parts of tertiary amine. The acrylic resin with a low refractive index has a refractive index of 1.40 to 1.42.

Preferably, the preparation method of the modified titanium oxide includes: ultrasonically dispersing the nano titanium oxide in a toluene solution, adding toluene diisocyanate and ⅔ amount of dibutyltin dichloride, and setting the temperature to 50-60° C. to react for 4-5 hours; adding 2-hydroxy acrylate and ⅓ amount of dibutyl tin dichloride, continuing the reaction for 2-3 hours, filtering, washing and drying to obtain a modified titanium oxide.

More preferably, the mass ratio of the nano titanium oxide, toluene diisocyanate and 2-hydroxy acrylate is 1: 3: (2-2.5); the dibutyltin dichloride is added in an amount of 0.12 to 0.15 wt % based on the total mass of toluene diisocyanate and 2-hydroxy acrylate.

Preferably, the preparation method of the transparent base film includes: mixed uniformly 3-5 wt % of modified zirconia and 95-97 wt % of polyethylene terephthalate, melt-extruding same at 250-280° C., and casting into a film to obtain a transparent base film.

Preferably, the preparation method of the modified zirconia includes: adding 1,4-butenediol into an aqueous sodium bisulfite solution, setting the temperature to 75-85° C. to react for 6-8 hours, adding a nano zirconium oxide methanol solution, and diluting and stirring; filtering, washing and drying to obtain a modified zirconia.

More preferably, the molar ratio of 1,4-butenediol to sodium bisulfite is 1: (0.7-0.9); the mass ratio of the 1,4-butenediol to the nanozirconia is (0.5-0.6): 1; the aqueous sodium bisulfite solution has a concentration of 20 to 25 wt %; and the nano-zirconia methanol solution has a concentration of 10-12 wt %.

More preferably, a twill optical film prepared by a preparation method of a twill optical film capable of realizing a 3D effect of a naked eye of a display screen.

In the solution, the cross-linking degree inside the grating is enhanced by adding a thiol-containing monomer; the cross-linking of the grating layer and filling, etc. is enhanced by a ring-opening reaction of thiol and carboxyl to epoxy groups; thus, the light loss inside the optical film is reduced, the light transmittance is improved, and the 3D stereoscopic effect is enhanced.

(1) In the solution, a grating coating with a high refractive index is used, and pentaerythritol tetrakis (3-mercaptopropionate) is added into the coating, because the addition of a mercapto monomer promotes the conversion of the monomer, thereby promoting a higher degree of cross-linked network, so that the internal density increases, light scattering is reduced, brightness is improved, and the degree of ghosting is reduced; meanwhile, the introduction of sulfur atoms increases the refractive index of the grating or the like.

At the same time, modified titanium oxide is added into the coating to improve the photocatalysis cross-linking; in the solution, the nano-titanium oxide is surface-modified and grafted in order to enhance its similar compatibility in the resin, and on the other hand, in order to reduce the refractive index difference between the titanium oxide and the resin, thereby reducing the internal light scattering and improving the light intensity; because the higher refractive index difference between the matrix and the filler is the main reason for the decrease of light intensity inside the photo-curable composite. It is noted that the single use of isocyanate for modification can reduce the degree of cross-linking, because the titanium oxide in the photocatalytic polymerization process does not contain carbon-carbon double bonds on the surface, and cannot better cross-link with the matrix resin, which will generate gaps and affect the light transmittance, thus affecting the 3D effect. In addition, the photoinitiation of the titanium oxide is not affected by the surface modification.

(2) For the filling material, allyl glycidyl ether is added into the coating material to increase the light transmittance of the filling coating material, increase the cross-linking density, and generate thermal cross-linking; an object is to make the filling coating fill better in the grating layer; because the single curing same by ultraviolet speed is faster and the stress is larger, the induced shrinkage causes a gap in the bonding interface between the grating layer and the filling layer, which increases the internal reflection and affects the light intensity and the degree of ghosting. For the allyl glycidyl ether and tertiary amine, the allyl group contains a carbon-carbon double bond which can generate ultraviolet grafting, and at the same time, the allyl group can generate a click reaction with a thiol group in the grating layer to increase the interfacial cross-linking; on the other hand, the epoxy group can be cross-linked with the carboxyl group in the acrylic resin and the thiol group in the grating layer under the promotion of the tertiary amine, thereby reducing the interfacial gap and reducing the degree of ghosting.

At the same time, zirconium tetra-n-propoxide is introduced. It can hydrolytically condense and generate zirconia (similar to sol-gel process) under high humidity controlled by ammonium dihydrogen phosphate saturated solution in thermal cross-linking process, enhancing light transmittance; the degree of ghosting is further reduced and the 3D visual effect is enhanced; thus, the process of curing by ultraviolet and thermal cross-linking and the stress of effective buffering reduces shrinkage.

It is noted that since the finally formed zirconium oxide of tetra-n-propoxy increases the refractive index of the filling layer, so that the refractive index difference between the grating layer and the filling layer is not in a more optimal range, the 3D effect is weakened, and therefore, the addition amount thereof is limited. A perfluorinated acrylic monomer having a lower refractive index is added at the same time; the difference therebetween is comprehensively adjusted to be not less than 0.15; allyl glycidyl ether is also an aliphatic epoxy material with a lower refractive index.

(3) Since pure polyethylene terephthalate film (PET) is easy to shrink at higher temperature, and its refractive index is greatly different from that of grating layer, modified zirconia is added to reduce refractive index difference, enhance light transmittance, increase thermal stability, inhibit shrinkage, and facilitate subsequent thermal cross-linking at 100-120° C. This results in a better 3D effect. In the solution, 1,4-butenediol is added to sodium bisulfate to form a diol having a sodium sulfonate ionic group, which can promote the dispersion of nanoparticles, and at the same time, the substance can act as a nucleating agent to improve the crystallization of PET, thereby improving the thermal stability.

DETAILED DESCRIPTION OF THE EMBODIMENTS

Reference will now be made in detail to embodiments of the present disclosure, examples of which are illustrated in the accompanying drawings. It is to be understood that the present disclosure may be embodied in several forms and that various changes may be made therein without departing from the spirit and scope of the present disclosure. Based on the embodiments of the present disclosure, all other embodiments obtained by a person skilled in the art without inventive effort fall within the scope of the present disclosure.

Example 1 step 1: (1) 1,4-butenediol and sodium bisulfite were weighed by a molar ratio of 1:0.8, and nano-zirconia was weighed by a mass ratio of 1,4-butenediol and nano-zirconia of 0.54: 1; same was compounded to form a sodium bisulfite aqueous solution with a concentration of 23 wt %, and a nano-zirconia methanol solution with a concentration of 10 wt %; 1,4-butenediol was added into an aqueous sodium bisulfite solution, the temperature was set to 80° C. to react for 8 hours, a nano zirconium oxide methanol solution was added, diluted and stirred; same was filtered, washed and dried to obtain a modified zirconia. (2) 4 wt % of the modified zirconia and 96 wt % of the polyethylene terephthalate were mixed uniformly, melt-extruded at 280° C., and cast into a film to obtain a transparent base film.

Step 2: (1) nano titanium oxide, toluene diisocyanate and 2-hydroxy acrylate were weighed by a mass ratio of 1:3:2.4; dibutyltin dichloride was weighed by 0.14 wt % of the total mass of toluene diisocyanate and 2-hydroxyacrylate; nano titanium oxide was ultrasonically dispersed in a toluene solution, toluene diisocyanate and ⅔ amount of dibutyl tin dichloride were added, and the temperature was set to 55° C. to react for 5 hours; 2-hydroxyacrylate and ⅓ amount of dibutyltin dichloride were added, the reaction was continued for 2.5 hours, and same was filtered, washed and dried to obtain a modified titanium oxide. (2) 60 parts of bisphenol fluorenyl urethane acrylate, 24 parts of bisphenol fluorenyl acrylate, 6 parts of modified titanium oxide, 15 parts of pentaerythritol tetrakis (3-mercaptopropionate), and 2 parts of 2,4,6-trimethylbenzoyl-diphenylphosphine oxide were mixed uniformly to obtain a grating coating. (3) A grating coating with a high refractive index was coated on one side of a transparent base film using a micro-nano imprint technique at an imprint rate of 24 m/h and a pressure of 0.12 Mpa, and cured by ultraviolet: the power was 80 W/cm$^2$, the energy was 850 mj/cm$^2$, and the photocuring time was 3 seconds to form a columnar lens array which is uniformly arranged; and a twill grating layer was obtained;

step 3: (1) 38 parts of a urethane acrylate, 42 parts of a perfluorinated acrylic monomer, 9 parts of an allyl glycidyl ether, 2.5 parts of tetra-n-propoxyzirconium, 2 parts of 2,4,6-trimethylbenzoyl-diphenylphosphine oxide and 0.5 parts of a tertiary amine were mixed uniformly to obtain a filling coating. (2) A filling coating with a low refractive index was coated on the twill grating layer and cured by ultraviolet; same was placed in an oven in an atmosphere of 96% relative humidity controlled by a saturated solution of ammonium dihydrogen phosphate; the temperature was set to 110° C., and same was thermally cross-linked for 4 hours; and a twill optical film was obtained.

Example 2 step 1: (1) 1,4-butenediol and sodium bisulfite were weighed by a molar ratio of 1:0.7, and nano-zirconia was weighed by a mass ratio of 1,4-butenediol and nano-zirconia of 0.5: 1; same was compounded to form a sodium bisulfite aqueous solution with a concentration of 20 wt %, and a nano-zirconia methanol solution with a concentration of 10 wt %; 1,4-butenediol was added into an aqueous sodium bisulfite solution, the temperature was set to 75° C. to react for 6 hours, a nano zirconium oxide methanol solution was added, diluted and stirred; same was filtered, washed and dried to obtain a modified zirconia. (2) 3 wt % of the modified zirconia and 97 wt % of the polyethylene terephthalate were mixed uniformly, melt-extruded at 250° C., and cast into a film to obtain a transparent base film.

Step 2: (1) nano titanium oxide, toluene diisocyanate and 2-hydroxy acrylate were weighed by a mass ratio of 1:3:2; dibutyltin dichloride was weighed by 0.12 wt % of the total mass of toluene diisocyanate and 2-hydroxyacrylate; nano titanium oxide was ultrasonically dispersed in a toluene solution, toluene diisocyanate and ⅔ amount of dibutyl tin dichloride were added, and the temperature was set to 50° C. to react for 4 hours; 2-hydroxyacrylate and ⅓ amount of dibutyltin dichloride were added, the reaction was continued for 2 hours, same was filtered, washed and dried to obtain a modified titanium oxide. (2) 50 parts of bisphenol fluorenyl urethane acrylate, 20 parts of bisphenol fluorenyl acrylate, 5 parts of modified titanium oxide, 12 parts of pentaerythritol tetrakis (3-mercaptopropionate), and 1 part of 2,4,6-trimethylbenzoyl-diphenylphosphine oxide were mixed uniformly to obtain a grating coating. (3) A grating coating with a high refractive index was coated on one side of a transparent base film using a micro-nano imprint technique at an imprint rate of 20m/h and a pressure of 0.1 Mpa, and cured by ultraviolet: the power was 60W/cm$^2$, the energy was 800 mj/cm$^2$, and the photocuring time was 3 seconds to form a columnar lens array which is uniformly arranged; and a twill grating layer was obtained;

Step 3: (1) 35 parts of a urethane acrylate, 40 parts of a perfluorinated acrylic monomer, 8 parts of an allyl glycidyl ether, 2 parts of tetra-n-propoxyzirconium, 1.2 parts of 2,4,6-trimethylbenzoyl-diphenylphosphine oxide and 0.5 parts of a tertiary amine were mixed uniformly to obtain a filling coating. (2) A filling coating with a low refractive index was coated on the twill grating layer and cured by ultraviolet; same was placed in an oven in an atmosphere of 98% relative humidity controlled by a saturated solution of ammonium dihydrogen phosphate; the temperature was set to 100° C., and same was thermally cross-linked for 3 hours; and a twill optical film was obtained.

Example 3 step 1: (1) 1,4-butenediol and sodium bisulfite were weighed by a molar ratio of 1:0.9, and nano-zirconia was weighed by a mass ratio of 1,4-butenediol and nano-zirconia of 0.6: 1; same was compounded to form a sodium bisulfite aqueous solution with a concentration of 25 wt %, and a nano-zirconia methanol solution with a concentration of 12 wt %; 1,4-butenediol was added into an aqueous sodium bisulfite solution, the temperature was set to 85° C. to react for 8 hours, a nano zirconium oxide methanol solution was added, diluted and stirred; same was filtered, washed and dried to obtain a modified zirconia. (2) 5 wt % of the modified zirconia and 95 wt % of the polyethylene terephthalate were mixed uniformly, melt-extruded at 280° C., and cast into a film to obtain a transparent base film.

Step 2: (1) nano titanium oxide, toluene diisocyanate and 2-hydroxy acrylate were weighed by a mass ratio of 1:3:2.5; dibutyltin dichloride was weighed by 0.15 wt % of the total mass of toluene diisocyanate and 2-hydroxyacrylate; nano titanium oxide was ultrasonically dispersed in a toluene solution, toluene diisocyanate and ⅔ amount of dibutyl tin dichloride were added, and the temperature was set to 60° C. to react for 5 hours; 2-hydroxyacrylate and ⅓ amount of dibutyltin dichloride were added, the reaction was continued for 3 hours, same was filtered, washed and dried to obtain a modified titanium oxide. (2) 65 parts of bisphenol fluorenyl urethane acrylate, 25 parts of bisphenol fluorenyl acrylate, 7 parts of modified titanium oxide, 18 parts of pentaerythritol tetrakis (3-mercaptopropionate), and 2 parts of 2,4,6-trimethylbenzoyl-diphenylphosphine oxide were mixed uniformly to obtain a grating coating. (3) A grating coating with a high refractive index was coated on one side of a transparent base film using a micro-nano imprint technique at an imprint rate of 30m/h and a pressure of 0.15 Mpa, and cured by ultraviolet: the power was 100 W/cm$^2$, the energy was 900 mj/cm$^2$, and the photocuring time was 3 seconds to form a columnar lens array which is uniformly arranged; and a twill grating layer was obtained;

Step 3: (1) 40 parts of a urethane acrylate, 45 parts of a perfluorinated acrylic monomer, 10 parts of an allyl glycidyl ether, 3 parts of tetra-n-propoxyzirconium, 2.5 parts of 2,4,6-trimethylbenzoyl-diphenylphosphine oxide and 0.8 parts of a tertiary amine were mixed uniformly to obtain a filling coating. (2) A filling coating with a low refractive index was coated on the twill grating layer and cured by ultraviolet; same was placed in an oven in an atmosphere of 98% relative humidity controlled by a saturated solution of ammonium dihydrogen phosphate; the temperature was set to 120° C., and same was thermally cross-linked for 3 hours; and a twill optical film was obtained.

Example 4: the modified zirconia in the transparent base film was directly replaced with nanozirconia.

Step 1: 4 wt % of the nano-zirconia and 96 wt % of the polyethylene terephthalate were mixed uniformly, melt-extruded at 280° C., and cast into a film to obtain a transparent base film.

Step 2: (1) nano titanium oxide, toluene diisocyanate and 2-hydroxy acrylate were weighed by a mass ratio of 1:3:2.4; dibutyltin dichloride was weighed by 0.14 wt % of the total mass of toluene diisocyanate and 2-hydroxyacrylate; nano titanium oxide was ultrasonically dispersed in a toluene solution, toluene diisocyanate and ⅔ amount of dibutyl tin dichloride were added, and the temperature was set to 55° C. to react for 5 hours; 2-hydroxyacrylate and ⅓ amount of dibutyltin dichloride were added, the reaction was continued for 2.5 hours, and same was filtered, washed and dried to obtain a modified titanium oxide. (2) 60 parts of bisphenol fluorenyl urethane acrylate, 24 parts of bisphenol fluorenyl acrylate, 6 parts of modified titanium oxide, 15 parts of pentaerythritol tetrakis (3-mercaptopropionate), and 2 parts of 2,4,6-trimethylbenzoyl-diphenylphosphine oxide were mixed uniformly to obtain a grating coating. (3) A grating coating with a high refractive index was coated on one side of a transparent base film using a micro-nano imprint technique at an imprint rate of 24 m/h and a pressure of 0.12 Mpa, and cured by ultraviolet: the power was 80 W/cm$^2$, the energy was 850 mj/cm$^2$, and the photocuring time was 3 seconds to form a columnar lens array which is uniformly arranged; and a twill grating layer was obtained;

step 3: (1) 38 parts of a urethane acrylate, 42 parts of a perfluorinated acrylic monomer, 9 parts of an allyl glycidyl ether, 2.5 parts of tetra-n-propoxyzirconium, 2 parts of 2,4,6-trimethylbenzoyl-diphenylphosphine oxide and 0.5 parts of a tertiary amine were mixed uniformly to obtain a filling coating. (2) A filling coating with a low refractive index was coated on the twill grating layer and cured by ultraviolet; same was placed in an oven in an atmosphere of 96% relative humidity controlled by a saturated solution of ammonium dihydrogen phosphate; the temperature was set to 110° C., and same was thermally cross-linked for 4 hours; and a twill optical film was obtained.

Example 5: the modified titanium oxide in the grating layer was not grafted with 2-hydroxy acrylate.

step 1: (1) 1,4-butenediol and sodium bisulfite were weighed by a molar ratio of 1:0.8, and nano-zirconia was weighed by a mass ratio of 1,4-butenediol and nano-zirconia of 0.54: 1; same was compounded to form a sodium bisulfite aqueous solution with a concentration of 23 wt %, and a nano-zirconia methanol solution with a concentration of 10 wt %; 1,4-butenediol was added into an aqueous sodium bisulfite solution, the temperature was set to 80° C. to react for 8 hours, a nano zirconium oxide methanol solution was added, diluted and stirred; same was filtered, washed and dried to obtain a modified zirconia. (2) 4 wt % of the modified zirconia and 96 wt % of the polyethylene terephthalate were mixed uniformly, melt-extruded at 280° C., and cast into a film to obtain a transparent base film.

Step 2: (1) nano titanium oxide and toluene diisocyanate were weighed by a mass ratio of 1: 3; dibutyltin dichloride was weighed according to 0.15 wt % of the mass of toluene diisocyanate; the nano titanium oxide was ultrasonically dispersed in a toluene solution, toluene diisocyanate and dibutyl tin dichloride were added, and the temperature was set to 55° C. to react for 5 hours; same was filtered, washed and dried to obtain a modified titanium oxide. (2) 60 parts of bisphenol fluorenyl urethane acrylate, 24 parts of bisphenol fluorenyl acrylate, 6 parts of modified titanium oxide, 15 parts of pentaerythritol tetrakis (3-mercaptopropionate), and 2 parts of 2,4,6-trimethylbenzoyl-diphenylphosphine oxide were mixed uniformly to obtain a grating coating. (3) A grating coating with a high refractive index was coated on one side of a transparent base film using a micro-nano imprint technique at an imprint rate of 24 m/h and a pressure of 0.12 Mpa, and cured by ultraviolet: the power was 80 W/cm$^2$, the energy was 850 mj/cm$^2$, and the photocuring time was 3 seconds to form a columnar lens array which is uniformly arranged; and a twill grating layer was obtained;

step 3: (1) 38 parts of a urethane acrylate, 42 parts of a perfluorinated acrylic monomer, 9 parts of an allyl glycidyl ether, 2.5 parts of tetra-n-propoxyzirconium, 2 parts of 2,4,6-trimethylbenzoyl-diphenylphosphine oxide and 0.5 parts of a tertiary amine were mixed uniformly to obtain a filling coating. (2) A filling coating with a low refractive index was coated on the twill grating layer and cured by ultraviolet; same was placed in an oven in an atmosphere of 96% relative humidity controlled by a saturated solution of ammonium dihydrogen phosphate; the temperature was set to 110° C., and same was thermally cross-linked for 4 hours; and a twill optical film was obtained.

Example 6: no pentaerythritol tetrakis (3-mercaptopropionate) was added to the grating layer.

step 1: (1) 1,4-butenediol and sodium bisulfite were weighed by a molar ratio of 1:0.8, and nano-zirconia was weighed by a mass ratio of 1,4-butenediol and nano-zirconia of 0.54: 1; same was compounded to form a sodium bisulfite aqueous solution with a concentration of 23 wt %, and a nano-zirconia methanol solution with a concentration of 10 wt %; 1,4-butenediol was added into an aqueous sodium bisulfite solution, the temperature was set to 80° C. to react for 8 hours, a nano zirconium oxide methanol solution was added, diluted and stirred; same was filtered, washed and dried to obtain a modified zirconia. (2) 4 wt % of the modified zirconia and 96 wt % of the polyethylene terephthalate were mixed uniformly, melt-extruded at 280° C., and cast into a film to obtain a transparent base film.

Step 2: (1) nano titanium oxide, toluene diisocyanate and 2-hydroxy acrylate were weighed by a mass ratio of 1:3:2.4; dibutyltin dichloride was weighed by 0.14 wt % of the total mass of toluene diisocyanate and 2-hydroxyacrylate; nano titanium oxide was ultrasonically dispersed in a toluene solution, toluene diisocyanate and ⅔ amount of dibutyl tin dichloride were added, and the temperature was set to 55° C. to react for 5 hours; 2-hydroxyacrylate and ⅓ amount of dibutyltin dichloride were added, the reaction was continued for 2.5 hours, and same was filtered, washed and dried to obtain a modified titanium oxide. (2) 60 parts of bisphenol fluorene-based polyurethane acrylate, 24 parts of bisphenol fluorene-based acrylate, 6 parts of modified titanium oxide, 15 parts of acrylate, and 2 parts of 2,4,6-trimethylbenzoyl-diphenylphosphine oxide were mixed uniformly to obtain a grating coating. (3) A grating coating with a high refractive index was coated on one side of a transparent base film using a micro-nano imprint technique at an imprint rate of 24 m/h and a pressure of 0.12 Mpa, and cured by ultraviolet: the power was 80 W/cm$^2$, the energy was 850 mj/cm$^2$, and the photocuring time was 3 seconds to form a columnar lens array which is uniformly arranged; and a twill grating layer was obtained;

step 3: (1) 38 parts of a urethane acrylate, 42 parts of a perfluorinated acrylic monomer, 9 parts of an allyl glycidyl ether, 2.5 parts of tetra-n-propoxyzirconium, 2 parts of 2,4,6-trimethylbenzoyl-diphenylphosphine oxide and 0.5 parts of a tertiary amine were mixed uniformly to obtain a filling coating. (2) A filling coating with a low refractive index was coated on the twill grating layer and cured by ultraviolet; same was placed in an oven in an atmosphere of 96% relative humidity controlled by a saturated solution of ammonium dihydrogen phosphate; the temperature was set to 110° C., and same was thermally cross-linked for 4 hours; and a twill optical film was obtained.

Example 7: allyl glycidyl ether and tertiary amine were not added to the filling layer coating.

step 1: (1) 1,4-butenediol and sodium bisulfite were weighed by a molar ratio of 1:0.8, and nano-zirconia was weighed by a mass ratio of 1,4-butenediol and nano-zirconia of 0.54: 1; same was compounded to form a sodium bisulfite aqueous solution with a concentration of 23 wt %, and a nano-zirconia methanol solution with a concentration of 10 wt %; 1,4-butenediol was added into an aqueous sodium bisulfite solution, the temperature was set to 80° C. to react for 8 hours, a nano zirconium oxide methanol solution was added, diluted and stirred; same was filtered, washed and dried to obtain a modified zirconia. (2) 4 wt % of the modified zirconia and 96 wt % of the polyethylene terephthalate were mixed uniformly, melt-extruded at 280° C., and cast into a film to obtain a transparent base film.

Step 2: (1) nano titanium oxide, toluene diisocyanate and 2-hydroxy acrylate were weighed by a mass ratio of 1:3:2.4; dibutyltin dichloride was weighed by 0.14 wt % of the total mass of toluene diisocyanate and 2-hydroxyacrylate; nano titanium oxide was ultrasonically dispersed in a toluene solution, toluene diisocyanate and ⅔ amount of dibutyl tin dichloride were added, and the temperature was set to 55° C. to react for 5 hours; 2-hydroxyacrylate and ⅓ amount of dibutyltin dichloride were added, the reaction was continued for 2.5 hours, and same was filtered, washed and dried to obtain a modified titanium oxide. (2) 60 parts of bisphenol fluorenyl urethane acrylate, 24 parts of bisphenol fluorenyl acrylate, 6 parts of modified titanium oxide, 15 parts of pentaerythritol tetrakis (3-mercaptopropionate), and 2 parts of 2,4,6-trimethylbenzoyl-diphenylphosphine oxide were mixed uniformly to obtain a grating coating. (3) A grating coating with a high refractive index was coated on one side of a transparent base film using a micro-nano imprint technique at an imprint rate of 24 m/h and a pressure of 0.12 Mpa, and cured by ultraviolet: the power was 80 W/cm$^2$, the energy was 850 mj/cm$^2$, and the photocuring time was 3 seconds to form a columnar lens array which is uniformly arranged; and a twill grating layer was obtained;

step 3: (1) 38 parts of urethane acrylate, 42 parts of a perfluorinated acrylic monomer, 9 parts of acrylate, 2.5 parts of tetra-n-propoxyzirconium, and 2 parts of 2,4,6-trimethylbenzoyl-diphenylphosphine oxide were mixed uniformly to obtain a filling coating. (2) A filling coating with a low refractive index was coated on the twill grating layer and cured by ultraviolet; same was placed in an oven in an atmosphere of 96% relative humidity controlled by a saturated solution of ammonium dihydrogen phosphate; the temperature was set to 110° C., and same was thermally cross-linked for 4 hours; and a twill optical film was obtained.

bisulfite solution, the temperature was set to 80° C. to react for 8 hours, a nano zirconium oxide methanol solution was added, diluted and stirred; same was filtered, washed and dried to obtain a modified zirconia. (2) 4 wt % of the modified zirconia and 96 wt % of the polyethylene terephthalate were mixed uniformly, melt-extruded at 280° C., and cast into a film to obtain a transparent base film.

Step 2: (1) nano titanium oxide, toluene diisocyanate and 2-hydroxy acrylate were weighed by a mass ratio of 1:3:2.4; dibutyltin dichloride was weighed by 0.14 wt % of the total mass of toluene diisocyanate and 2-hydroxyacrylate; nano titanium oxide was ultrasonically dispersed in a toluene solution, toluene diisocyanate and ⅔ amount of dibutyl tin dichloride were added, and the temperature was set to 55° C. to react for 5 hours;

2-hydroxyacrylate and ⅓ amount of dibutyltin dichloride were added, the reaction was continued for 2.5 hours, and same was filtered, washed and dried to obtain a modified titanium oxide. (2) 60 parts of bisphenol fluorenyl urethane acrylate, 24 parts of bisphenol fluorenyl acrylate, 6 parts of modified titanium oxide, 15 parts of pentaerythritol tetrakis (3-mercaptopropionate), and 2 parts of 2,4,6-trimethylbenzoyl-diphenylphosphine oxide were mixed uniformly to obtain a grating coating. (3) A grating coating with a high refractive index was coated on one side of a transparent base film using a micro-nano imprint technique at an imprint rate of 24 m/h and a pressure of 0.12 Mpa, and cured by ultraviolet: the power was 80 W/cm$^2$, the energy was 850 mj/cm$^2$, and the photocuring time was 3 seconds to form a columnar lens array which is uniformly arranged; and a twill grating layer was obtained;

step 3: (1) 38 parts of a urethane acrylate, 42 parts of a perfluorinated acrylic monomer, 9 parts of an allyl glycidyl ether, 8 parts of tetra-n-propoxyzirconium, 2 parts of 2,4,6-trimethylbenzoyl-diphenylphosphine oxide and 0.5 parts of a tertiary amine were mixed uniformly to obtain a filling coating. (2) A filling coating with a low refractive index was coated on the twill grating layer and cured by ultraviolet; same was placed in an oven in an atmosphere of 96% relative humidity controlled by a saturated solution of ammonium dihydrogen phosphate; the temperature was set to 110° C., and same was thermally cross-linked for 4 hours; and a twill optical film was obtained.

Experiment: the twill optical films prepared in Examples 1 to 8 were subjected to light transmittance and the degree of ghosting performance tests for ensuring the 3D display effect of the optical films, and the obtained data are shown in the following table:

| Examples | Example 1 | Example 2 | Example 3 | Example 4 | Example 5 | Example 6 | Example 7 | Example 8 |
|---|---|---|---|---|---|---|---|---|
| Light transmittance | 90% | 88% | 87% | 82% | 85% | 84% | 83% | 90% |
| Ghosting rate | 15% | 16% | 17% | 25% | 19% | 21% | 22% | 28% |
| 3D effect | OK | OK | OK | OK | OK | OK | OK | Not OK |

Example 8: zirconium tetra-n-propoxide in the fill layer coating was increased to 8 parts.

step 1: (1) 1,4-butenediol and sodium bisulfite were weighed by a molar ratio of 1:0.8, and nano-zirconia was weighed by a mass ratio of 1,4-butenediol and nano-zirconia of 0.54: 1; same was compounded to form a sodium bisulfite aqueous solution with a concentration of 23 wt %, and a nano-zirconia methanol solution with a concentration of 10 wt %; 1,4-butenediol was added into an aqueous sodium Conclusion: according to the data of Examples 1-3, it can be seen that the prepared twill optical film has good 3D naked eye effect, and its transmittance is up to 90%. At the same time, the degree of ghosting is at least 15% with excellent performance.

Comparing the data of Examples 4 to 8 with that of Example 1, it can be found that in Example 4, no modification of the nanozirconia resulted in a decrease in light transmittance and an increase in the degree of ghosting due to: the dispersion of the nanoparticles is decreased, so that the light transmittance is decreased; at the same time, since the modified material can promote the recrystallization of PET, the shrinkage of the subsequent thermal cross-linking process is reduced, so that the grating layer has a better shape, thereby reducing the degree of ghosting. In Example 5, since the modified titanium oxide is not grafted with the 2-hydroxyacrylate, the similar compatibility is decreased, the reactive cross-linking property is decreased, the refractive index difference and the gap are increased, the light transmittance is decreased, and thus the degree of ghosting is increased. In Example 6, since no pentaerythritol tetrakis (3-mercaptopropionate) is added, the internal cross-linking is reduced and the interfacial cross-linking is reduced, so that the light internal reflection and scattering are increased, the light transmittance is reduced and the degree of ghosting is increased; in Example 7, also because no allyl glycidyl ether and tertiary amine were added, the interfacial cross-linking decreased, resulting in decreased performance. In Example 8, since zirconium tetra-n-propoxide is added in an excessive amount, the refractive index of the filling layer is significantly increased, so that the refractive index difference between the filling layer and the grating layer is less than 0.1, and thus the steric effect is poor.

Finally, it should be noted that while the present disclosure has been described in detail with reference to the foregoing embodiments, it will be understood by a person skilled in the art that various changes in form and details may be made therein without departing from the spirit and scope of the present disclosure. It will be understood by a person skilled in the art that various changes in form and details may be made therein without departing from the spirit and scope of the present disclosure.

What is claimed is:

1. A preparation method of a twill optical film capable of realizing a 3D effect of a naked eye of a display screen, comprising the steps of:
    step 1: coating a grating coating on one side of a transparent base film using a micro-nano imprint technique, and curing the transparent base film by ultraviolet to form a uniformly arranged columnar lens array; and obtaining a twill grating layer;
    step 2: coating a filling coating on the twill grating layer and curing the twill grating layer by ultraviolet; placing the twill grating layer in an oven in an atmosphere with a relative humidity of 95-98% controlled by a saturated solution of ammonium dihydrogen phosphate;
    setting the temperature to 100-120° C., and thermally cross-linking the twill grating layer for 3-4 hours; and obtaining a twill optical film;
    wherein the raw material of the grating coating comprises the following components: by weight, 50-65 parts of an acrylic resin with a high refractive index, 20-25 parts of a bisphenol fluorenyl acrylate, 5-7 parts of a modified titanium oxide, 12-18 parts of pentaerythritol tetrakis (3-mercaptopropionate), and 1-2 parts of a photoinitiator; and the acrylic resin with a high refractive index has a refractive index of 1.61 to 1.63;
    the raw materials of the filling coating include the following components: by weight, 35-40 parts of an acrylic resin with a low refractive index, 40-45 parts of a perfluorinated acrylic monomer, 8-10 parts of an allyl glycidyl ether, 2-3 parts of tetra-n-propoxyzirconium, 1.2-2.5 parts of a photoinitiator, and 0.5-0.8 parts of tertiary amine; the acrylic resin with a low refractive index has a refractive index of 1.40 to 1.42; the preparation method of the modified titanium oxide comprises: ultrasonically dispersing nano titanium oxide in a toluene solution, adding toluene diisocyanate and 2/3 amount of dibutyl tin dichloride, and setting the temperature to 50-60° C. to react for 4-5 hours; adding 2-hydroxy acrylate and ⅓ amount of dibutyl tin dichloride, continuing the reaction for 2-3 hours, filtering, washing and drying to obtain a modified titanium oxide;
    wherein the dibutyltin dichloride is added in an amount of 0.12 to 0.15wt% based on the total mass of toluene diisocyanate and 2-hydroxy acrylate;
    wherein in step 1, in the micro-nano imprint technique, the imprinting speed is 20-30 m/h and the pressure is 0.1-0.15 Mpa; in the process of curing by ultraviolet, the power is 60-100 W/cm$^2$, the energy is 800-900 mj/cm$^2$, and the curing time is 2-3 seconds.

2. The preparation method of a twill optical film capable of realizing a 3D effect of a naked eye of a display screen according to claim 1, wherein the mass ratio of the nano titanium oxide, toluene diisocyanate and 2-hydroxy acrylate is 1: 3: 2-2.5.

3. The preparation method of a twill optical film capable of realizing a 3D effect of a naked eye of a display screen according to claim 1, wherein the preparation method of the transparent base film comprises: mixing uniformly 3-5 wt % of modified zirconia and 95-97 wt % of polyethylene terephthalate, melt-extruding the mixed zirconia and polyethylene terephthalate at 250-280° C., and casting into a film to obtain a transparent base film.

4. The preparation method of a twill optical film capable of realizing a 3D effect of a naked eye of a display screen according to claim 3, wherein the preparation method of the modified zirconia comprises: adding 1,4-butenediol into an aqueous sodium bisulfite solution, setting the temperature to 75-85° C. to react for 6-8 hours, adding a nano zirconium oxide methanol solution, and diluting and stirring; filtering, washing and drying to obtain a modified zirconia.

5. The preparation method of a twill optical film capable of realizing a 3D effect of a naked eye of a display screen according to claim 4, wherein the molar ratio of the 1,4-butenediol to sodium bisulfite in the aqueous solution of sodium bisulfite is 1: 0.7-0.9; the mass ratio of the nano-zirconia in the 1,4-butenediol and the nano-zirconia methanol solution is 0.5-0.6:1; the aqueous sodium bisulfite solution has a concentration of 20 to 25 wt %; and the nano-zirconia methanol solution has a concentration of 10-12 wt %.

6. A twill optical film prepared by the preparation method of a twill optical film capable of realizing a 3D effect of a naked eye of a display screen according to claim 1.

* * * * *